US006217694B1

(12) United States Patent
Taniguchi

(10) Patent No.: US 6,217,694 B1
(45) Date of Patent: Apr. 17, 2001

(54) IMAGE TRANSFER METHOD AND IMAGE-RECEIVING MEMBER THEREFOR

(75) Inventor: Keishi Taniguchi, Susono (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 08/878,122

(22) Filed: Jun. 18, 1997

(30) Foreign Application Priority Data

Jun. 19, 1996 (JP) .................................................. 8-178530
May 26, 1997 (JP) .................................................. 9-151551

(51) Int. Cl.[7] .......................... B44C 1/165; B32B 31/20; B32B 7/00; C09J 5/04

(52) U.S. Cl. .......................... 156/235; 156/230; 156/239; 156/241; 156/247; 156/277; 156/289; 427/146; 427/147; 427/148; 428/204; 428/914

(58) Field of Search .................................... 156/230, 231, 156/232, 233, 234, 235, 236, 237, 238, 239, 246, 241, 247, 277, 289; 427/146, 147, 148; 428/204, 914

(56) References Cited

U.S. PATENT DOCUMENTS 2,721,817 * 10/1955 Hastings, III et al. ................ 154/47
2,810,673 * 10/1957 Wooldrik ................................ 154/95
4,058,644 * 11/1977 DeVries et al. ...................... 428/200
4,731,354 3/1988 Taniguchi et al. ................... 503/208
5,142,722 9/1992 Kolb .
5,260,256 * 11/1993 Takahara et al. .................... 503/227
5,328,754 7/1994 Yuyama et al. ...................... 428/212
5,392,059 * 2/1995 Ueno et al. ......................... 342/188
5,431,501 * 7/1995 Hale et al. ...................... 400/120.02
5,447,900 9/1995 Suzaki et al. ....................... 503/207
5,482,912 1/1996 Furuya et al. ...................... 503/207
5,575,877 * 11/1996 Hale et al. .......................... 156/240
5,741,387 * 4/1998 Coleman ............................. 156/240
6,042,984 * 3/2000 Taniguchi ............................ 430/126

FOREIGN PATENT DOCUMENTS 33 41 961 5/1984 (DE) .
43 02 210 7/1993 (DE) .
44 04 832 7/1995 (DE) .
2 387 793 11/1978 (FR) .
2 278 807 12/1994 (GB) .
WO 93/04855 3/1993 (WO) .
WO 96/03284 2/1996 (WO) .

* cited by examiner

*Primary Examiner*—Richard Crispino
*Assistant Examiner*—J. A. Lorengo
(74) *Attorney, Agent, or Firm*—Oblon, Spivak, McClelland, Maier & Neustadt, P.C.

(57) ABSTRACT

A method includes a step of transferring an image formed on an image transfer sheet to an image-receiving member under the application of heat and pressure thereto, the image-receiving member having a transparent material layer for receiving the image thereon and a support member for supporting the transparent material layer. The support member of the image-receiving member comprises concave and convex portions on the surface thereof, and the transparent material layer is provided in such a manner that the concave portions of the support member are filled with the transparent material layer and that the transparent material layer has a flat surface.

7 Claims, 1 Drawing Sheet

IMAGE TRANSFER METHOD AND IMAGE-RECEIVING MEMBER THEREFOR

BACKGROUND OF THE INVENTION

1. Field of the Invention

The present invention relates to a method of transferring an image obtained on an image transfer sheet to other image-receiving members such as cloth, canvas, Japanese paper, bond paper, wood, leather, glass, earthenware and metal, without impairing the feeling and texture of each of the above-mentioned image-receiving members. In this case, the image formed on the image transfer sheet is obtained using the following image forming apparatuses:

1) an electrophotographic copying apparatus capable of producing a toner image by the xerography comprising an electrostatic image transfer step,
2) a printer capable of transferring a thermofusible ink or sublimation-type dye by the thermal image transfer recording method,
3) an ink-jet printer capable of transferring an aqueous ink or a thermofusible ink by the ink-jet process, and
4) a printing apparatus for screen process printing, letter-press printing, offset printing or stencil printing.

The present invention also relates to an image-receiving member for use with the above-mentioned image transfer method.

2. Discussion of Background

In recent years, with the spread and development of the copying and printing apparatuses, not only the originally-developed use of each apparatus, that is, to produce an image to an image-receiving medium, but also new uses have been actively studied based on the applied functions of the apparatus.

For example, there is proposed a method of transferring an image obtained on an image transfer sheet using the copying and printing apparatuses to an image-receiving member such as cloth, canvas, Japanese paper, bond paper, plastics, wood, leather, glass, earthenware or metal, and fixing the image thereto. To be more specific, the above-mentioned image transfer method can be effectively applied to the manufacturing of clothes such as T-shirts, sweat shirts, aprons and jackets, cups, trays, tiles, stained glass, panels, and reproduced pictures which are made to order, or designed to be sold on a small scale, not by mass-production. Further, such demand has greatly expanded because high quality images can be more easily printed on the image-receiving members by using a full-color dry-type electrophotographic copying apparatus.

An image transfer sheet from which the above-mentioned copied or printed image is transferred to the image-receiving member is conventionally known, for instance, as disclosed in Japanese Laid-Open Patent Application 52-82509. For instance, such an image transfer sheet comprises a support and a thermal transfer layer formed thereon, on which the image is formed using the copying or printing apparatus. When the copied or printed image formed on the above-mentioned conventional image transfer sheet is transferred to the image-receiving member, the image-bearing thermal transfer layer of the image transfer sheet is brought into contact with an image-receiving member under the application of heat and pressure thereto, thereby transferring the image to the image-receiving member. Thereafter, only the support may be released from the image-receiving member.

The above-mentioned conventional image transfer method has the drawback that the image cannot be clearly transferred to an image-receiving member of which surface smoothness is low, for example, canvas.

The reason for this will now be explained with reference to FIG. 1.

As shown in FIG. 1, the surface roughness of an image-receiving member 2 is high, and there are convex and concave portions on the surface thereof. An image transfer sheet is pressed to the image-receiving member 2 under the application of heat and pressure thereto according to the conventional image transfer method. In this case, an image-bearing thermal transfer layer 1 of the image transfer sheet is mostly filled into the concave portions on the surface of the image-receiving member 2 if the maximum height of surface roughness of the image-receiving member 2 exceeds the thickness of the thermal transfer layer 1 of the image transfer sheet. As a result, the image-bearing thermal transfer layer 1 is scarcely formed on the convex portions, so that there appear non-printed spots in the transferred image.

In the case where thermal printing is carried out using a thermofusible image transfer ink ribbon and a thermal head, of which technical field is different from that of the present invention, there is the problem that ink images cannot be sharply formed on a paper such as bond paper with a low surface smoothness. In this case, the cause of the problem is contrary to that of the conventional problem concerning to the present invention. Namely, the thermally fused ink is not transferred to the concave portions although it is transferred to the convex portions of the rough paper.

In the aforementioned field of thermal printing using the thermofusible image transfer ink ribbon, there is proposed a thermofusible image transfer ink ribbon comprising a filling-up layer which comprises an adhesive layer and a bridging transfer layer, as disclosed in Japanese Laid-Open Patent Application 7-257058, in order to improve the sharpness of the image printed on the rough paper. According to this application, before the thermofusible ink is imagewise transferred to the rough paper, the filling-up layer of the ink ribbon is thermally transferred to the surface of the rough paper so as to compensate the surface roughness of the paper. In this case, the filling-up layer transferred to the surface of paper forms an image-receiving layer with a bridging structure on the convex portions of the rough paper, as shown in FIG. 2. In FIG. 2, reference numeral 2' indicates a rough paper, and reference numeral 3 indicates a bridging transfer layer transferred from the ink ribbon.

By the above-mentioned method, the surface profile of the image-receiving member, such as the texture of bond paper is concealed by the filling-up layer, so that it is impossible to obtain sharp images without impairing the texture of the image-receiving member.

Furthermore, in the field of thermal printing using the thermal head and thermofusible image transfer ink ribbon, it is also proposed in Japanese Laid-Open Patent Application 59-95194 that a thermofusible binder be coated on the surface of an image-receiving member in advance. In this application there is the description that the adhesion of the thermally-transferred ink image to the image-receiving member is increased by previously coating on the image-receiving member a thermofusible binder with a fusion temperature lower than that of the thermofusible ink. In light of the above-mentioned description, it is apparent that the object is to improve the fixing performance of ink image thermally transferred to the surface of the image-receiving member.

Any of the previously mentioned two inventions, that relates to the thermal printing process using the thermal head and thermofusible image transfer ink ribbon, is not intended to clearly transfer the image formed on an image transfer sheet to the image-receiving member with a low surface smoothness without impairing the feeling and texture of the image-receiving member.

SUMMARY OF THE INVENTION

Accordingly, a first object of the present invention is to provide a method of transferring an image formed on an image transfer sheet using a variety of copying and printing apparatuses to an image-receiving member such as cloth, canvas, Japanese paper, bond paper, wood, leather, glass, earthenware or metal, in particular, to an image-receiving member with high surface roughness, for example, canvas, woven cloth or nonwoven fabric, without impairing the feeling and texture of each of the above-mentioned image-receiving members.

A second object of the present invention is to provide an image-receiving member for use with the above-mentioned image transfer method.

The above-mentioned first object of the present invention can be achieved by a method of transferring an image formed on an image transfer sheet to an image-receiving member which comprises a transparent material layer for receiving the image thereon and a support member for supporting the transparent material layer, under the application of heat and pressure thereto.

The second object of the present invention can be achieved by an image-receiving member comprising a transparent material layer, and a support member comprising concave and convex portions on the surface thereof for supporting the transparent material layer thereon, the transparent material layer being provided in such a manner that the concave portions of the support member are filled with the transparent material layer and that the transparent material layer has a flat surface.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

According to the present invention, there is provided a method of transferring an image obtained on an image transfer sheet to an image-receiving member under the application of heat thereto. The above-mentioned image-receiving member comprises a transparent material layer for receiving the image thereon, and a support member for supporting the transparent material layer.

Figure 1:
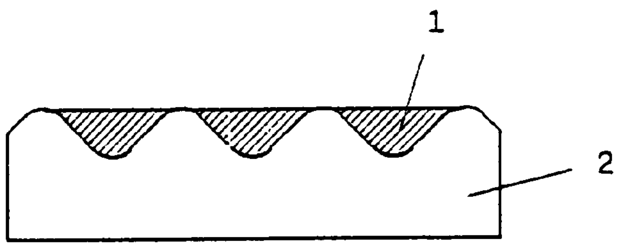
FIG. 1 is a schematic cross-sectional view which shows an image-bearing thermal transfer layer of the image transfer sheet thermally transferred to an image-receiving member, in explanation of the occurrence of non-printed spots in the transferred image.
Figure 2:
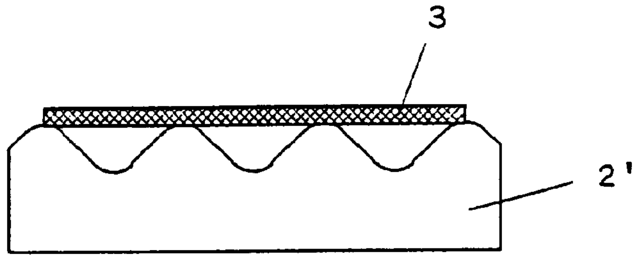
FIG. 2 is a schematic cross-sectional view which shows a filling-up layer of the thermofusible ink ribbon thermally transferred to the surface of a rough paper, in explanation of the bridging structure of the filling-up layer.
Figure 3:
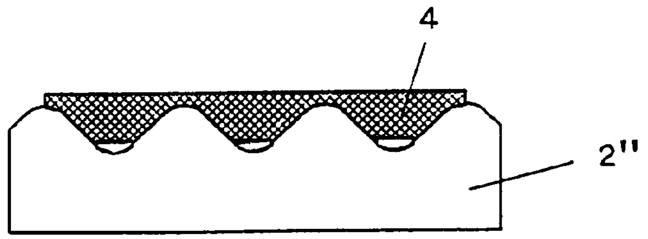
FIG. 3 is a schematic cross-sectional view which shows an image-receiving member of the present invention comprising a transparent material layer and a support member.

To achieve the object of the present invention, as shown in FIG. 3, a transparent material layer 4 may be formed on a support member 2" of an image-receiving member in such a fashion that the concave portions of the support member 2" are filled with the transparent material layer 4. Further, it is desirable that the transparent material layer 4 have a flat surface provided over the convex portions of the support member 2" so as to ensure the close contact of the image-bearing image transfer sheet with the transparent material layer 4 anywhere. The thickness of a transparent material layer portion provided over the convex portions of the support member 2", which varies depending on the kind and the entire thickness of support member 2" of the image-receiving member to be employed, is preferably 1/10,000 to 1/2 the entire thickness of the image-receiving member.

In the image-receiving member, the surface of the transparent material layer 4 formed on the support member 2" is not always required to be completely smooth. The surface roughness of the transparent material layer 4 may be lower than that of the support member 2".

It is preferable that all the concave portions of the support member 2" for use in the image-receiving member be thoroughly filled with the transparent material layer 4. In practice, however, the object of the present invention can be attained when the transparent material layer 4 is filled in each concave portion to such a degree that at least 1/3 the sectional area of the concave portion is filled with the transparent material layer 4 on average.

Such a filling-up condition of the concave portions of the support member 2" with the transparent material layer 4 can be controlled by changing the pressure application conditions when the image formed on the image transfer sheet is thermally transferred to the image-receiving member. The filling-up condition of the concave portions of the support member 2" can be examined by cutting the image-receiving member and observing the cross section thereof using a microscope.

The image transfer sheet for use in the present invention is a member on which an image is formed using a variety of copying and printing apparatuses, and from which the thus formed image is thermally transferred to the image-receiving member.

For the image transfer sheet, conventional image transfer sheets, for example, as disclosed in Japanese Laid-Open Patent Application 62-82509 can be employed.

According to the present invention, the transparent material layer is provided on the support member in the image-receiving member as previously mentioned. The transparency of the above-mentioned transparent material layer may be to such a degree that an object in contact with the transparent material layer can be recognized therethrough. Namely, the transparent material layer may not be completely colorless and transparent, and may not have a specific light transmittance. Therefore, for example, a slightly colored transparent material is usable. However, it is preferable that the visible light transmittance of the transparent material layer be 100 to 30% so as to maintain the feeling and texture of the image-receiving member.

Specific examples of the transparent material for use in the transparent material layer include polyurethane, polyamide, polyester, polyolefin, cellulose derivatives such as cellulose nitrate and cellulose acetate, styrene resins and styrene copolymers such as polystyrene and poly $\alpha$-methylstyrene, acrylic resins such as methyl polyacrylate, methyl polymethacrylate, ethyl polyacrylate and ethyl polymethacrylate, vinyl polymers such as vinyl chloride-vinyl acetate copolymer and ethylene-vinyl alcohol copolymer, rosin and rosin ester resins such as rosin-modified maleic acid resin, natural and synthetic rubbers such as polyisoprene rubber and styrene butadiene rubber, a variety of ionomers, epoxy resin and phenolic resin.

The above-mentioned polyurethane includes a thermoplastic polyurethane obtained from the reaction between an isocyanate and a polyol having hydroxyl group at the end of a molecule.

In this case, examples of the isocyanate for producing the polyurethane are aromatic diisocyanates such as tolylene diisocyanate and diphenylmethane-4,4'-diisocyanate; aliphatic cyclic diisocyanates such as isophorone diisocyanate;

and aliphatic diisocyanates such as trimethylene diisocyanate, tetramethylene diisocyanate, hexamethylene diisocyanate and dodecamethylene diisocyanate.

As the polyol for producing the polyurethane, at least one polyhydroxy compound is employed. Examples of such a polyhydroxy compound include alkane polyols such as alkane diols, for example, 1,5-pentanediol, 1,8-octanediol, 1,10-decanediol and 1,12-dodecanediol; polyester polyols such as aliphatic polyester diols, for example, a polyester diol comprising as a constituent unit at least an aliphatic diol or an aliphatic dicarboxylic acid; and polyether polyols such as polyether diols, for example, diethylene glycol, triethylene glycol, polyethylene glycol, tripropylene glycol, polypropylene glycol, and an adduct of bisphenol A with an alkylene oxide such as ethylene oxide.

As the polyamide used as the transparent material, there can be employed nylon 6, nylon 11, nylon 12, nylon 13, nylon 610, nylon 612, nylon 616, and copolymer nylon comprising those nylon materials, such as nylon 6/12.

As the polyester used for the transparent material layer, it is preferable to employ at least an aliphatic diol component or an aliphatic dicarboxylic acid component, more preferably both of the aliphatic diol component and the aliphatic dicarboxylic acid component. It is further preferable that a saturated aliphatic dicarboxylic acid component be used as the dicarboxylic acid component.

Specific examples of the aliphatic diol component for use in the polyester are ethylene glycol, diethylene glycol, triethylene glycol, polyethylene glycol, propylene glycol, dipropylene glycol, tripropylene glycol, polypropylene glycol, 1,3-butanediol, 1,4-butanediol, neopentyl glycol, 1,6-hexanediol, and polymethylene glycol.

Specific examples of the aliphatic dicarboxylic acid component for use in the polyester include unsaturated aliphatic dicarboxylic acids such as maleic acid and fumaric acid; and saturated aliphatic dicarboxylic acids such as succinic anhydride, adipic acid, azelaic acid, sebacic acid, suberic acid and dodecanedioic acid.

Examples of the polyolefin used for the transparent material layer are polyethylene such as low-density polyethylene and straight-chain low-density polyethylene, ethylene-butene-1 copolymer, ethylene-(4-methylpentene-1) copolymer, ethylene-vinyl acetate copolymer, ethylene-acrylic acid copolymer, ethylene-methacrylic acid copolymer, ethylene-acrylate copolymer, ethylene-methacrylate copolymer, propylene-butene-1 copolymer, ethylene-propylene copolymer, ethylene-propylene-butene-1 copolymer, and modified polyolefin such as maleic-anhydride-modified polyethylene and maleic-anhydride-modified polypropylene.

Of these polyolefins, the modified polyolefins are preferably employed.

The transparent material layer for use in the present invention may further comprise a compounding additive such as ethylene vinyl acrylate, ethylene ethyl acrylate, polyvinyl butyral, and polyvinyl acetal. Further, as a self-crosslinking component, there can be employed polymeric compounds and modified resins thereof and mixtures thereof, such as ethylene-vinyl acetate-acryl copolymer resin comprising methylol group and/or alkoxymethyl group, polyvinyl alcohol, methyl cellulose, carboxymethyl cellulose, polyethylene oxide, polyvinyl pyrrolidone, starch and modified starch, gelatin, and silicone resin; and waxes such as polyethylene wax, paraffin wax, carnauba wax, candelilla wax, rice wax, lanolin wax, ester wax, oxidized wax and petroleum wax.

In addition, the transparent material layer may further comprise a tackifier, antioxidant, ultraviolet absorbing agent, photostabilizer, quencher, coloring agent, antistatic agent, plasticizer and filler when necessary. In particular, when at least one of the ultraviolet absorbing agent, photostabilizer, antioxidant or quencher is contained in the transparent material layer, the light resistance stability of the transferred image is improved. In this case, it is preferable that those additives be contained in such an amount that the light transmittance of the obtained transparent material layer with respect to the visible light is in the range of 100 to 30% as previously mentioned.

Specific examples of the ultraviolet absorbing agent for use in the present invention include salicylic acid compounds such as phenyl salicylate, p-di-tert-butylphenyl salicylate and p-octylphenyl salicylate; benzophenone compounds such as 2,4-dihydroxybenzophenone, 2-hydroxybenzophenone, 2-hydroxy-4-octoxybenzophenone, 2-hydroxy-4-dodecyloxybenzophenone, 2,2'-dihydroxy-4-methoxybenzophenone, 2,2'-dihydroxy-4,4'-dimethoxybenzophenone and 2-hydroxy-4-methoxy-5-sulfobenzophenone; benzotriazole compounds such as 2,2'-(di-hydroxy-5'-methylphenyl)benzotriazole, 2-(2'-hydroxy-5'-tert-butylphenyl)benzotriazole, 2-(2'-hydroxy-3'-tert-butyl-5'-methylphenyl)benzotriazole, 2-(2'-hydroxy-3',5'-di-tert-butylphenyl)-5-chlorobenzotriazole and 2-(2'-hydroxy-3',5'-di-tert-amylphenyl)benzotriazole; cyanoacrylate compounds such as 2-ethylhexyl-2-cyano-3,3'-diphenylacrylate and ethyl-2-cyano-3,3'-diphenylacrylate; metallic oxides such as titanium oxide, zinc oxide and cerium oxide; oxaldianilide; triazine compounds; dibenzoylmethane compounds; and benzylidene compounds.

The photostabilizer for use in the transparent material layer can efficiently trap a radical generated by the ultraviolet application to the transparent material layer so as to make the radical inert and inhibit the chain reaction from occurring. Thus, when a dye component is contained in the transferred image, deterioration of the dye can be prevented.

Specific examples of the photostabilizer for use in the present invention are hindered amines such as 4-benzoyloxy-2,2,6,6-tetramethylpiperidine, bis(2,2,6,6-tetramethyl-4-piperidyl)sebacate, bis(1,2,2,6,6-pentamethyl-4-piperidinyl)sebacate, 2-(3,5-di-tert-butyl-4-hydroxybenzyl)-2-n-butylmalonic acid bis(1,2,2,6,6-pentamethyl-4-piperidyl) and tetrakis(2,2,6,6-tetramethyl-4-piperidyl)-1,2,3,4-butanetetracarboxylate; hindered phenols such as 2,4-di-tert-butylphenyl-3,5-di-tert-butyl-hydroxybenzoate; nickel complexes such as [2,2'-thiobis(4-tert-butylphenolate)]-tert-butylamine nickel (II) and [2,2'-thiobis-(4-tert-butylphenolate)]-2-ethylhexylamine nickel (II); and nickel salts of phosphoric ester such as nickel salt of monoethyl 3,5-di-tert-butyl-4-hydroxybenzylphosphate.

The antioxidant for use in the transparent material layer is classified into two types, that is, a radical acceptor capable of stabilizing a peroxide by the application of proton thereto, and a peroxide decomposer capable of making a hydroperoxide into a stable alcohol.

Examples of the former antioxidant are phenol compounds and amine compounds. Specific examples of such a phenol compound include hydroquinone; gallate; and hindered phenol compounds such as 2,6-di-tert-butyl-p-cresol, stearyl-β(3,5-di-tert-butyl-4-hydroxyphenyl)propionate, 2,2'-methylenebis(4-methyl-6-tert-butylphenol), 2,2'-methylenebis(4-ethyl-6-tert-butylphenol), 4,4'-thiobis(3-methyl-6-tert-butylphenol), 1,1,3-tris(2-methyl-4-hydroxy- 5-tert-butylphenyl)butane, 1,3,5-trimethyl-2,4,6-tris(3,5-di-tert-4-hydroxybenzyl)benzene, tris(3,5-di-tert-butyl-4-hydroxybenzyl)isocyanurate, and tetrakis[methylene-3(3',5'-di-tert-butyl-4-hydroxyphenyl)propionate]methane.

Specific examples of the amine compound serving as the antioxidant are N,N'-diphenyl-p-phenylenediamine, phenyl-β-naphthylamine, phenyl-α-naphthylamine, N,N'-β-naphthyl-p-phenylenediamine, N,N'-diphenylethylenediamine, phenothiazine, N,N'-di-sec-butyl-p-phenylenediamine, and 4,4'-tetramethyl-diaminodiphenylmethane.

Examples of the latter antioxidant of a peroxide decomposer type include sulfur-containing compounds and phosphorus-containing compounds.

Specific examples of such a sulfur-containing compound serving as the antioxidant are dilauryl thiodipropionate, distearyl thiodipropionate, laurylstearyl thiodipropionate, dimyristyl thiodipropionate, distearyl β,β'-thiodibutylate, 2-mercaptobenzimidazole, and dilauryl sulfide.

Specific examples of the phosphorus-containing compound serving as the antioxidant are triphenyl phosphite, trioctadecyl phosphite, tridecyl phosphite, trilauryl trithiophosphite, diphenylisodecyl phosphite, trinonylphenyl phosphite, and distearylpentaerythritol phosphite.

The quencher for use in the transparent material layer is a compound capable of taking up excitation energy from the molecule excited by the absorption of ultraviolet light so as to restrain the reaction of the excited molecule. For such a quencher, there can be employed a variety of conventional metal complexes.

In the image-receiving member, the previously mentioned transparent material layer is provided on the support member. The transparent material layer is closely attached in the form of a film to the support member. The transparent material layer can be provided on the support member under the above-mentioned close contact condition by coating a solution, emulsion or dispersion comprising the compositions of the transparent material layer on the support member, and then drying the same. In this case, there can be employed various coating and printing processes, such as curtain coating, spray coating, brush coating, wire bar coating, roll coater coating, electrostatic coating, curtain flow coating, screen process printing and gravure printing.

Alternatively, using a transparent material layer transfer sheet comprising a transparent material layer, the transparent material layer may be thermally transferred to the support member. The transfer of the transparent material layer to the support member may be carried out by conducting a plurality of thermal transfer steps. Furthermore, it is preferable to employ the image transfer sheet as the above-mentioned transparent material layer transfer sheet. To be more specific, a thermal transfer layer of the image transfer sheet can be favorably used as the transparent material layer for use in the image-receiving member of the present invention. The thermal transfer layer for use in the image transfer sheet which bears no image thereon may be thermally transferred to the support member of the image-receiving member before image transfer. This method has the advantage that the transparent material layer provided on the support member of the image-receiving member and the image-bearing thermal transfer layer to be transferred from the image transfer sheet to the above-mentioned transparent material layer can be made the same in shape and area very easily. By this method, therefore, the appearance of the image transferred to the image-receiving member becomes excellent and the image transfer can be carried out conveniently and economically.

Further, in the case where the above-mentioned method is employed, it is possible to make the formulation for the thermal transfer layer of the image transfer sheet substantially the same as that for the transparent material layer provided on the support member of the image-receiving member except the image-constituting component, such as a toner or ink, contained in the thermal transfer layer. Therefore, it is not necessary to change the thermal transfer conditions such as the temperature, pressure and pressure-application time through the steps of thermally transferring a transparent material layer to the support member of the image-receiving member and thermally transferring the image from the image transfer sheet. As a result, the process and apparatus for transferring an image can be made more convenient. Furthermore, when the image-bearing thermal transfer layer of the image transfer sheet and the transparent material layer of the image-receiving member are substantially the same in formulation, both layers can be completely combined, so that the problem of interlaminar peeling can be prevented and the transferred image can be fixed on the image-receiving member more stably.

Other features of this invention will become apparent in the course of the following description of exemplary embodiments, which are given for illustration of the invention and are not intended to be limiting thereof.

EXAMPLE 1

[Preparation of image transfer sheet]

The following components were mixed to prepare a coating liquid for a releasing layer:

| | Parts by Weight |
|---|---|
| Cold-setting silicone rubber emulsion (Trademark "SE-1980 Clear", made by Dow Corning Toray Silicone Co., Ltd.) | 10 |
| Water | 40 |

The above prepared coating liquid for the releasing layer was coated on one side of a sheet of high quality paper with a basis weight of 104.7 $g/m^2$ serving as a support, and dried so that the deposition amount of the composition might be 1.6 $g/m^2$ on a dry basis. Thus, a releasing layer was provided on the support.

Thereafter, the following components were mixed to prepare a coating liquid for thermal transfer layer (a):

| | Parts by Weight |
|---|---|
| Self-crosslinking ethylene-vinyl acetate-acryl copolymer resin emulsion (Trademark "Polysol EF-421" made by Showa Highpolymer Co., Ltd.) | 10 |
| Self-crosslinking ethylene-vinyl acetate-acryl copolymer resin emulsion (Trademark "Polysol EF-250N" made by Showa Highpolymer Co., Ltd.) | 10 |

The above-prepared coating liquid for thermal transfer layer (a) was coated on the releasing layer by a wire bar, and dried so that the deposition amount of the composition might be 32 $g/m^2$ on a dry basis. Thus, a thermal transfer layer was provided on the releasing layer, whereby an image transfer sheet (a) was prepared.

The above prepared image transfer sheet (a) was cut so as to have a sample piece of B4 size.

Using a commercially available color copying apparatus "PRETER 550" (Trademark), made by Ricoh Company, Ltd., a mirror copy image was formed on the sample piece of the image transfer sheet (a) by means of the mirror image copying function from a photograph of a picture taken by permission of the painter.

The thus obtained image-bearing sample piece of the image transfer sheet (a) was cut in a size of 334 mm×243 mm (F4 size) with the picture image being located at the center of the sample piece.

An image-free sample piece (F4 size) of the image transfer sheet (a) was placed on the surface of a commercially available canvas for oil painting "AC Canvas" (Trademark), made by Holbein Art Materials Inc., in such a manner that the image-free thermal transfer layer side of the image transfer sheet (a) was in contact with the canvas, and subjected to pressing at 160° C. for 15 seconds using a commercially available thermal transfer pressing machine "Rotary Press" (Trademark), made by Mainichi Mark Co., Ltd. After the canvas and the image transfer sheet (a) tightly attached thereto were cooled to room temperature, the support of the image transfer sheet (a) was released. Consequently, there remained on the canvas the image-free thermal transfer layer of F4 size without any missing portion so as to serve as the first transparent material layer of the image-receiving member.

Another image-free sample piece (F4 size) of image transfer sheet (a) was brought into contact with the above-mentioned first transparent material layer and subjected to thermal pressing under the same thermal pressing conditions as mentioned above. Then, the support of the sample piece was released, so that the second transparent material layer and the first transparent material layer were closely laminated. The entire thickness of the transparent material layer provided on the canvas was increased.

Thereafter, the picture-image-bearing sample piece of the image transfer sheet (a) was brought into close contact with the above-mentioned second transparent material layer provided on the canvas, and subjected to thermal pressing under the same thermal pressing conditions as mentioned above.

As a result, the picture image was clearly transferred to the canvas from the image transfer sheet (a) without partial missing of image. The obtained image was extremely realistic without impairing the feeling and texture of the canvas. The background portion around the picture image was clear and transparent, so that the transferred picture image appeared as if it were the original picture.

EXAMPLE 2

The commercially available adhesive tape was attached to the same canvas for oil painting as employed in Example 1 in such a fashion that an area of F4 size was enclosed with the adhesive tape.

The same coating liquid for thermal transfer layer of the image transfer sheet (a) as employed in Example 1 was coated on the above enclosed area of the canvas by a wire bar, and dried so that the deposition amount of the coating liquid might be 50 $g/m^2$ on a dry basis, whereby a transparent material layer was provided on the canvas. After the coating liquid was dried, the adhesive tape was removed from the canvas.

Thereafter, the same picture-image-bearing sample piece (F4 size) of the image transfer sheet (a) as employed in Example 1 was exactly placed on the above-mentioned transparent material layer (F4 size) coated on the canvas, and subjected to thermal pressing under the same thermal pressing conditions as mentioned in Example 1.

As a result, the picture image was clearly transferred to the canvas from the image transfer sheet (a) without partial missing of image. The obtained image was extremely realistic without impairing the feeling and texture of the canvas.

EXAMPLE 3

The procedure for transferring the image to the canvas for oil painting as employed in Example 1 was repeated except that the coating liquid for thermal transfer layer (a) for use in the image transfer sheet (a) employed in Example 1 was replaced by a coating liquid (b) with the following formulation:

| | Parts by Weight |
|---|---|
| Self-crosslinking ethylene-vinyl acetate-acryl copolymer resin emulsion (Trademark "Polysol EF-250N" made by Showa Highpolymer Co., Ltd.) | 10 |
| Non-reactive type carbon based urethane resin emulsion (Trademark "Superflex 460" made by Dai-Ichi Kogyo Seiyaku Co., Ltd.) | 20 |

As a result, the picture image was clearly transferred to the canvas from the image transfer sheet without partial missing of image. The obtained image was extremely realistic without impairing the feeling and texture of the canvas.

COMPARATIVE EXAMPLE 1

The procedure for transferring the image to the canvas for oil painting as employed in Example 1 was repeated except that no transparent material layer was provided on the canvas before image transferring.

As a result, there were observed many non-printed spots in the transferred picture image corresponding to the convex portions on the surface of the canvas. Therefore, the image was free from sharpness as a whole.

EXAMPLE 4

The procedure for transferring the image to the canvas for oil painting as employed in Example 1 was repeated except that the image was formed on the sample piece of the image transfer sheet (a) using a commercially available sublimation-type image transfer ink ribbon made by Eastman Kodak Co., and a sublimation-type image transfer printer made on an experimental basis by Ricoh Company, Ltd., instead of the color copying apparatus.

As a result, the image was clearly transferred to the canvas from the image transfer sheet (a) without partial missing of image, and the texture of the canvas was not impaired.

EXAMPLE 5

The procedure for transferring the image to the canvas for oil painting as employed in Example 4 was repeated except that the coating liquid for thermal transfer layer (a) for use in the image transfer sheet (a) employed in Example 4 was replaced by a coating liquid (c) with the following formulation:

| | Parts by Weight |
|---|---|
| Self-crosslinking ethylene-vinyl acetate-acryl copolymer resin emulsion (Trademark "Polysol EF-421", made by Showa Highpolymer Co., Ltd.) | 10 |
| Self-crosslinking ethylene-vinyl acetate-acryl copolymer resin emulsion (Trademark "Polysol EF-250N" made by Showa Highpolymer Co., Ltd.) | 10 |
| Polymeric ultraviolet absorbing agent of emulsion type (Trademark "UVA-383MA" made by BASF Japan Ltd.) | 1 |

As a result, the image was clearly transferred to the canvas from the image transfer sheet without partial missing of image, and the texture of the canvas was not impaired.

Each of the picture images transferred to the canvas in Examples 4 and 5 was subjected to fading test in such a manner that a cyan-color portion was cut from each picture image and exposed to a xenon fadeometer for 30 hours. The image density was measured using a McBeth densitometer RD-918 before and after the fading test. The results are shown in Table 1.

TABLE 1

| | Image Density before Light Exposure | Image Density after Light Exposure |
|---|---|---|
| Example 4 | 1.20 | 0.92 |
| Example 5 | 1.21 | 1.20 |

As can be seen from the results shown in Table 1, the light resistance stability of the image transferred by the method of the present invention was excellent.

As previously explained, the image formed on the image transfer sheet using a variety of copying and printing apparatuses can be clearly transferred to the image-receiving member without impairing the feeling and texture of the image-receiving member. The image transferred to the image-receiving member is excellent in terms of the stability of fixing properties and light resistance. In addition, the image transfer method of the present invention is very convenient and economic.

Japanese Patent Application No. 8-178530 filed Jun. 19, 1996 is hereby incorporated by reference.

What is claimed is:

1. A method of transferring an image formed on an image transfer sheet onto an image-receiving layer under the application of heat and pressure thereto comprising the steps of:

a) providing an image transfer sheet, said image transfer sheet comprising
   i) a support;
   ii) a releasing layer formed on said support;
   iii) a transparent thermal transfer layer formed on said releasing layer; and
   iv) an image formed on said transparent thermal transfer layer b) providing an image receiving layer, said image receiving layer comprising
   i) a support member; and
   ii) a transparent material layer formed on said support member wherein said support member includes concave and convex portions on the surface thereof, said concave portions being completely filled with said transparent material layer; and c) contacting said image transfer sheet with said image receiving layer under the application of heat and pressure thereto in order to release and transfer said transparent thermal transfer layer and image formed thereon from said image transfer sheet to said image receiving layer.

2. The method as claimed in claim 1, wherein said transparent material layer of said image-receiving member is provided on said support member by thermally transferring said transparent material layer to said support member, using a transparent material layer transfer sheet which comprises said transparent material layer.

3. The method as claimed in claim 2, wherein the transfer of said transparent material layer to said support member is carried out by conducting a plurality of thermal transfer steps.

4. The method as claimed in claim 1, wherein the support member is selected from the group consisting of cloth, canvas, Japanese paper, bond paper, wood, leather, glass, earthenware and metal.

5. The method as claimed in claim 4, wherein the support member is canvas.

6. The method as claimed in claim 1, wherein at least one third the sectional area of said concave portions are filled with said transparent material layer on average.

7. A method of transferring an image formed on an image transfer sheet onto an image-receiving layer under the application of heat and pressure thereto comprising the steps of:

a) providing an image transfer sheet, said image transfer sheet comprising
   i) a support;
   ii) a releasing layer formed on said support;
   iii) a transparent thermal transfer layer formed on said releasing layer; and
   iv) an image formed on said transparent thermal transfer layer b) providing an image receiving layer, said image receiving layer comprising
   i) a support member; and
   ii) a transparent material layer formed on said support member wherein said support member includes concave and convex portions on the surface thereof, said concave portions being completely filled with said transparent material and that said transparent material layer has a flat surface; and c) contacting said image transfer sheet with said image receiving layer under the application of heat and pressure thereto in order to release and transfer said image carrying transparent thermal transfer layer from said image transfer sheet to said image receiving layer.

* * * * *